Patented July 12, 1938

2,123,574

UNITED STATES PATENT OFFICE 2,123,574

HARD COMPOSITIONS OF MATTER

Philip M. McKenna, Latrobe, Pa.

No Drawing. Original application September 6, 1935, Serial No. 39,505. Divided and this application February 24, 1937, Serial No. 127,558

16 Claims. (Cl. 75—136)

This application is a division of my pending application for Letters Patent, Serial No. 39,505, Hard compositions of matter, filed September 6, 1935, upon which U. S. Patent No. 2,093,844, issued September 21, 1937, and other divisional applications are filed herewith.

My invention relates to new hard compositions of matter. It has to do, more particularly, with certain novel compositions of matter, notable for their combined strength and hardness, so that they are particularly useful in the construction of tools, dies and other articles of wear-resisting or corrosion-resisting nature, as well as articles which are required to resist deformation or destruction at high temperatures and pressures. In particular, my invention relates to the production of new hard compositions of matter, which are particularly useful as the hard bits or tips including the cutting edges of tools intended for cutting hard materials. These compositions are also particularly adapted to use as wire-drawing dies.

The principal object of my invention is to provide new hard compositions of matter, which have greater combined strength, hardness and resistance to deformation at high temperatures and pressures than any hard compositions of matter heretofore known.

A further object of my invention is to provide new hard compositions of matter, having great combined strength, hardness and resistance to deformation, which are made from macro-crystalline carbides of the metals of the group including tantalum and columbium, with, as a minor constituent, one or more of the carbides of the group including tantalum, columbium, titanium and zirconium, which carbides are characterized, not only by their macro-crystalline form, but by a carbon content in true monatomic ratio to the metal or metals present. In other words, it is an object of my invention to produce new hard compositions of matter, having useful characteristics as indicated, which are made from the new macro-crystalline product, instead of the amorphous material heretofore known, for example, as tantalum carbide and consisting of carburized tantalum, in which the carbon is not present in exact monatomic ratio to the tantalum.

A further object of my invention is to provide novel hard compositions of matter, having great combined strength and hardness, which include titanium carbide or zirconium carbide, or both of them, as constituents.

It is a further object of my invention to provide novel hard compositions of matter, including tantalum carbide or columbium carbide, or both of them, together with tungsten metal or molybdenum metal, or both, and a metal or metals of the iron group, in which the proportion of the metals of the group including tungsten and molybdenum to the total non-carbide ingredients of the composition is substantially higher than has been possible heretofore without sacrificing strength. This is an important feature, because an increased proportion of tungsten or molybdenum, or both, imparts to the hard compositions of matter the property of resisting deformation, especially at high temperatures, but, heretofore, it has not been possible to include as much tungsten or molybdenum as was desired, because of the deleterious effect upon the strength of the resulting composition.

Further objects, and objects relating to details and economies of production and operation, will definitely appear from the detailed description to follow. In one instance, I accomplish the objects of my invention by the devices and means set forth in the following specification. My invention is clearly defined and pointed out in the appended claims.

Hard compositions of matter have been known, heretofore, which consisted of an amorphous material, called "tantalum carbide", together with certain proportions of a metal or metals of the group including tungsten and molybdenum, and a metal or metals of the group including iron, cobalt and nickel. The best of these hard compositions of matter was composed as follows: Amorphous tantalum carbide, 78 per cent, nickel, 10.2 per cent, tungsten, 11.8 per cent. This material was made by comminuting the amorphous tantalum carbide and metallic tungsten in a ball mill, using nickel balls, in a bath of naphtha, until the mixture contained the tantalum carbide, tungsten and nickel in the desired degree of fineness and in the required proportions above given. The naphtha was then removed entirely by heating in a partial vacuum at a red heat. A piece was then formed from this dried powder of the desired shape and that piece heated in an electric furnace, under a partial vacuum, corresponding approximately to a pressure of from 70 to 80 microns of mercury, for forty minutes. As the result of this treatment, a hard composition of matter was formed having a Rockwell "A" hardness of 86.5. The strength of the piece thus formed is indicated by the fact that the piece, having a thickness of .200 inch and a width of .375 inch, resting on supports 11/16 of an inch apart, when pressed in the middle with a one centimeter Brinell ball, broke under a load of 1980 kilograms.

Another example of similar hard compositions of matter, heretofore known, is one which comprised 80 per cent amorphous tantalum carbide, 8 per cent nickel and 12 per cent tungsten. This composition had a Rockwell "A" hardness of 87.75 and broke, under the same conditions as specified above, at a load of 1500 kilograms. These two hard compositions of matter, just described, represent what I believe to be the most desirable hard compositions of this type heretofore made, known or used.

These compositions were made from a material which was called "tantalum carbide", but in which the carbon was not present in exact monatomic ratio to the tantalum. This material was amorphous in character, in that it did not present crystalline form to the unaided human eye. For the purposes of this specification I define "macro-crystalline" as having particles which average greater than .01 millimeter in largest cross section dimension and "amorphous" as having particles which average less than .01 millimeter in largest cross section dimension. I understand that there is another sense, in which all solid bodies may be described as crystalline, and may be shown to have ordered atomic arrangement by X-ray methods, or to have crystalline form which may be seen under the microscope, but I do not use the term in this sense, in this specification.

It will be observed that, in the two compositions above-mentioned, the nickel and tungsten together constitute 22 per cent and 20 percent, respectively, of the composition, and that the tungsten constitutes 53.6 per cent and 60 per cent, respectively, of the ingredients of the composition other than the tantalum carbide. I had believed it desirable, if possible, to increase the proportion of tungsten in the non-carbide ingredients of the composition, but I had found that this was not feasible, heretofore, because a further increase in the proportion of tungsten resulted in a decrease in the strength of the composition, which was undesirable, as the piece would break or chip when used as a metal cutting tool. Thus, although a higher percentage of tungsten is desirable, in order to give the composition increased resistance to deformation, especially at high temperatures, this increased proportion of tungsten could not be obtained, heretofore, without an accompanying decrease in the strength of the composition.

Hard compositions of matter have been proposed, heretofore, including columbium carbide, of the amorphous type in which the carbon is not present in true monatomic ratio to the columbium, together with certain proportions of tungsten and cobalt, but such hard compositions were lacking in practical value, because of the weakness of the material.

It has also been proposed, heretofore, to make hard compositions of matter from a mixture of amorphous tantalum carbide and amorphous columbium carbide, the particles of which were united into a cohesive mass by a mixture of metallic iron and molybdenum. Although such compositions were hard, they were lacking in strength as they would break under a load which was only about one-third of the breaking load of the amorphous tantalum carbide composition heretofore referred to.

In general, my invention consists of novel hard compositions of matter made from macro-crystalline carbides of the metals of the group including tantalum and columbium, containing carbon in true monatomic ratio to the metals present. The macro-crystalline multi-carbide forming the starting ingredient for the new composition is comminuted, in a non-oxidizing bath, as by a ball mill, for such length of time as needed to reduce the crystals to the desired degree of fineness and to incorporate in the mixture the desired proportions of a metal or metals of the group including tungsten and molybdenum, and of a metal or metals of the iron group. The powdered mixture thus formed after drying off some of the naphtha is pressed to the shape of the piece to be made, the linear dimensions, however, being from 15 to 25 per cent greater than those of the ultimate piece, depending upon the shrinkage which takes place in the process, and the piece thus shaped is heated, under a partial vacuum, in an electric furnace, for about forty minutes, at a temperature of about 1430° C. The heating should require about two hours in all, one hour and twenty minutes being consumed in gradually raising the furnace to the ultimate temperature and removing the gas and vapors, and the furnace being maintained at the ultimate temperature for about forty minutes. As a result of this treatment, the shaped piece shrinks into a cohesive bit of like shape, but smaller dimensions, and it is believed that the metal or metals of the group including tungsten and molybdenum, and the metal or metals of the iron group, included in the composition, function to unite the grains of carbide into a cohesive mass. As will be shown hereinafter, the resulting composition has a hardness equal to that of the compositions heretofore referred to, with a strength and resistance to deformation, especially at high temperatures, which exceeds that of said compositions.

The macro-crystalline multi-carbides which I contemplate using in my present invention, and the method of making such multi-carbides, are fully described in my pending application for United States Letters Patent, Serial No. 31,521, filed July 15, 1935, entitled, "Carbides of tantalum and like metals and methods of producing the same", to which cross-reference is hereby made.

The invention of the present application contemplates novel hard compositions of matter embodying macro-crystalline multi-carbides in which the major constituent is tantalum carbide or columbium carbide and the minor constituent is formed by a carbide or carbides of a metal or metals of the group consisting of tantalum, columbium, titanium and zirconium.

My application, Serial No. 39,505, upon which U. S. Patent No. 2,093,844 issued September 21, 1937, is directed to compositions embodying such a multi-carbide in which the major constituent is tantalum carbide and the minor constituent is formed by carbides of a plurality of metals of the group consisting of columbium, titanium and zirconium.

Two other divisional applications of such application, Serial No. 39,505, are filed herewith, one being directed to hard compositions embodying a macro-crystalline simple carbide, that is, either tantalum carbide or columbium carbide. The other of such divisional applications is directed to compositions of matter embodying multi-carbides of metals of the group consisting of tantalum, columbium, titanium and zirconium in which the major constituent is columbium carbide. I believe that the minor constituent of these multi-carbides is present in solid solution in the major constituent, and this belief is confirmed by the X-ray spectrograms of these multi-carbides. My present invention contemplates, also, new hard compositions of matter including macro-crystalline multi-carbides in which either tantalum carbide or columbium carbide constitutes the major constituent, and one or more carbides of the metals of the group including tantalum, columbium, titanium and zirconium constitute the minor constituent. A study of these multi-carbides, also, has shown that the minor constituent is present in solid solution in the major constituent within certain limiting percentages of the solute. Thus, I contemplate the formation of new compositions of matter from macro-crystalline multi-carbides in which, for instance, titanium carbide or zirconium carbide, or both of them, are present in solid solution in tantalum carbide or columbium carbide, and I have found that the hard compositions of matter made from these macro-crystalline multi-carbides exhibit a very useful combination of hardness, strength and resistance to deformation, surpassing to a surprising degree anything that has been produced heretofore.

In general, the percentage of multi-carbide contained in my new composition is somewhat less than the percentage of tantalum-carbide in the hard compositions of matter heretofore known, such as the two examples previously referred to, but, notwithstanding, the combined hardness, strength and resistance to deformation is greater. In general, also, in my new compositions made in accordance with this invention, the tungsten or molybdenum, or both, constitute a greater proportion of the non-carbide ingredients of the composition than has been the case heretofore, but, nevertheless, this increase in the proportion of tungsten does not result in a weakening of the composition, but, on the contrary, a strong composition is obtained and one having greater resistance to deformation, especially at high temperature. This result is surprising, in view of the prior experience which led the worker in this art to believe that an increase in the proportion of tungsten would necessarily weaken the composition.

The following are specific examples of new compositions of matter, made in accordance with my invention, from macro-crystalline multi-carbides of the character described in my pending application for United States Letters Patent, Serial No. 31,521. In the formulas, given in this specification, for these multi-carbides, I have included in parentheses the symbol or symbols for the metal or metals, the carbides of which form the minor constituent. It is necessary, in forming hard compositions of matter from these multi-carbides to provide other metals, which I believe perform the function of uniting the grains of multi-carbide to form a cohesive mass and forming a matrix in which the grains of the hard carbide are embedded. These metals forming the matrix may comprise one or more of the metals of the group including tungsten and molybdenum, and one or more of the metals of the iron group. Small quantities of manganese, beryllium and aluminum may also, at times, be present with advantageous results. In general, I have found that a combination of tungsten and nickel serves, in most circumstances, to form the sort of matrix desired.

A valuable hard composition of matter may be made, in accordance with my present invention, using as the starting material the macro-crystalline multi-carbide, in which TaC constitutes the major constituent, and CbC the minor constituent. This multi-carbide is expressed by the formula Ta(Cb)C. The CbC may constitute from 1 to 25 per cent of the multi-carbide. In this composition, the Ta(Cb)C may constitute from 50 to 81 per cent of the composition, W, from 13 to 43 per cent, and Ni, from 5 to 15 per cent. The preferred range of proportions is as follows: CbC, from 5 to 13 per cent of the Ta(Cb)C, Ta(Cb)C, 68 to 80 per cent, W, 13 to 25 per cent, and Ni, 5 to 12 per cent. The specific proportions of an actual specimen of this composition, made from macro-crystalline Ta(Cb)C, in which the proportion of CbC was 8.8 per cent, are as follows: Ta(Cb)C, 75 per cent, W, 15 per cent, and Ni, 10 per cent. Tests upon this specimen showed that it had a Rockwell "A" hardness of 88.5 and a breaking strength of 2060 kilograms. Thus, in both strength and hardness, this composition was superior to the prior compositions hereinbefore mentioned. Tests upon cutting tools, including bits made from this composition, showed that they were very much better than any heretofore known, in that the tools did not fail, either by deformation, that is "mushrooming", or by chipping. Cutting tools made from this composition have been put to actual use at a governmental arsenal, in turning anti-aircraft projectiles, and this experience has demonstrated that these tools will cut longer, without chipping or showing fatigue cracks, and without the necessity of frequent dressing, than any heretofore known.

Another new hard composition of matter may be made in accordance with my invention, using as a starting material the macro-crystalline multi-carbide expressed by the formula Ta(Zr)C, in which TaC constitutes the major constituent and ZrC the minor constituent. The ZrC may constitute from 1 to 23 per cent of the Ta(Zr)C. The Ta(Zr)C may constitute from 55 to 80 per cent of the composition, W, from 4 to 20 per cent, and Ni, from 5 to 26 per cent. The preferred range of proportions is as follows: ZrC, from 8 to 13 per cent of the Ta(Zr)C, Ta(Zr)C, from 65 to 80 per cent of the composition, W, from 8 to 18 per cent, and Ni, from 12 to 18 per cent. A specimen of this composition, which has shown very good results under tests, had the following specific proportions: ZrC, 9 per cent of the Ta(Zr)C, Ta(Zr)C, 74 per cent of the composition, W, 11 per cent, Ni, 15 per cent. This specimen showed a Rockwell "A" hardness of 88.8, and a breaking strength of 1887 kilograms. Thus, it was harder than prior compositions made from amorphous TaC, and of comparable strength. Cutting tests with tools, including bits made of this composition, showed a greater resistance to deformation under high temperatures than the prior compositions made from amorphous tantalum carbide.

The specific examples of hard compositions of matter, made in accordance with my invention, just given, are illustrative of the new compositions that may be made by the use, as starting materials, of the macro-crystalline multi-carbides of the character described and claimed in my pending application for United States Letters Patent, Serial No. 31,521. It will be understood, of course, that I have not described specifically all of the possible combinations. In general, molybdenum may be substituted for all or a part of the tungsten in any of these compositions, it being understood that, in making such substitution, the proportion of the metal used should be adjusted in the ratio of the atomic weights of tungsten and molybdenum. It will be understood, also, that cobalt may be substituted in whole or in part for the nickel, the proportions being adjusted in the ratio of the atomic weights of cobalt and nickel. Iron may also be substituted for a part of the nickel or cobalt, but the fact that iron, in finely divided form, oxidizes readily, under the conditions present in making these compositions, renders its use in substitution for all or a major proportion of the nickel undesirable.

To express the range of proportions of these compositions, I prefer to state the proportions in molecular and atomic percentages of the ingredients. I prefer that the multi-carbide shall constitute from 68.1 to 55.64 molecular per cent of the composition, that a metal or metals of the group including tungsten and molybdenum should constitute from 15.58 to 17.66 atomic per cent of the composition, and that a metal or metals of the iron group shall constitute from 20.5 to 26.7 atomic per cent of the composition. I prefer, further, that, in the case of the multi-carbides, the minor constituent or constituents shall constitute less than 40 molecular per cent of the multi-carbide, as this is about the maximum which will go into solid solution in the major constituent. I prefer, however, to use less than the maximum amount of minor constituent, which would go into solid solution in the major constituent, and I have determined that it is advantageous to have the minor constituent constitute about 25 per cent of the multi-carbide.

I believe that, where the multi-carbide is one in which CbC is the major constituent, compositions having a better combined strength, hardness and resistance to deformation may be produced by substituting molybdenum, in whole or in part, for the tungsten.

The preferred methods for making these new compositions of matter are described in detail and claimed in my pending application for Letters Patent, Serial No. 66,707, Method of producing hard compositions of matter, which likewise is a division of my pending application for Letters Patent, Serial No. 39,505, Hard compositions of matter, filed September 6, 1935, of which the present application is a division. Consequently, the various steps will not be described in detail herein.

In general, the macro-crystalline multi-carbide, is ground and comminuted in a ball mill with metallic tungsten or molybdenum, and with nickel, cobalt or iron, the comminution with the metallic ingredients being continued until the ingredients reach the desired state of fineness and until they are present in the proper proportions. The comminution is preferably carried out in a bath of naphtha or other suitable material, to prevent oxidation, and it is preferable that the naphtha be previously purified, as by subjecting it to freshly cut surfaces of sodium, to remove oxygen and sulphur-containing compounds.

The finely comminuted particles are partially dried, 1 to 5 per cent of the naphtha being left to protect the powder from oxidation, and the thoroughly mixed particles are then pressed into bits of the desired shape and of a size such as to compensate for the shrinkage of 15 to 25 per cent, which will later take place in the heat treatment.

The bits are then subjected to heat treatment under a vacuum of from 40 to 7 microns of mercury pressure, in an electric furnace, for about forty minutes at a temperature of from 1400° C. to 1500° C., depending upon the ratio of the metals, the temperature being slowly raised until it reaches this temperature. The vacuum is obtained by a Gaede mercury diffusion pump which draws off and absorbs gases and vapors, including the vapors coming from the hydrocarbon, and the outlet of the mercury diffusion pump is connected to an oil pump. The bits are preferably heated in an electric induction furnace, being placed within a covered graphite crucible.

I believe that one reason for the good characteristics of hard compositions of matter, which have as an ingredient a comminuted macro-crystalline multi-carbide including TiC or ZrC, is that, when the TiC or ZrC, or both of them, are in solid solution in the TaC or CbC, they are capable of treatment by processes of powder metallurgy, which would destroy their surfaces when present alone, in the form of the chemically simple ZrC or TiC. That is to say, the TaC or CbC, in which the ZrC or TiC is dissolved, keeps it from being oxidized or otherwise reacted upon, during the grinding and heat treatments. Indicative of this is the fact that TiC and ZrC, per se, cannot be prepared by the method used to produce macro-crystalline TaC, but, when prepared in solid solution in TaC or CbC, they can be treated with acid, and dried with air, and preserve an exact monatomic ratio of carbon to metal.

Another reason for the great utility of the hard compositions of matter, including a comminuted macro-crystalline multi-carbide as an ingredient, is that such multi-carbides are harder than the simple carbides, following the generalization that all solid solutions are harder than their simple components. This effect is fundamental and is believed to be due to the straining of the atomic lattice, which is stressed internally by the substitution of atoms of different atomic radius in place of the Ta or Cb.

Furthermore, compositions made with macro-crystalline multi-carbides as ingredients generally have lower thermal conductivity, for the strained and harder lattices are poorer conductors. This is an advantage when the composition is used in certain kinds of drawing dies and tools, for, in these cases, a greater proportion of the heat, generated by mechanical work at the point of contact, is distributed to the piece on which the work is done. This may be a factor in the successful results obtained in cutting hardened high speed steel with the composition made with comminuted Ta(CbTi)C as an ingredient. In the cutting tests of this composition, it was observed that the chips of high speed steel came off at a yellow or white heat, at which temperature this steel is soft and workable, although it is still hard at a red heat, unlike steels which do not have this property of red-hardness. In this specimen of hard composition, the thermal conductivity was observed to be .036 calorie per degree C., per second, per centimeter, while a similar composition made with TaC as the hard ingredient had a thermal conductivity of .06 calorie, per degree C., per second, per centimeter.

Whenever I use the term "macro-crystalline" in the appended claims, with reference to a carbide or multi-carbide, I mean a carbide or multi-carbide having particles which average greater than .01 millimeter in largest cross section dimension and produced by the reaction between a metal or metals and carbon in the presence of a menstruum other than the reactants.

I am aware that the products herein disclosed may be varied considerably, without departing from the spirit of my invention, and, therefore, I claim my invention broadly as indicated by the appended claims.

What I claim is:

1. The new hard composition of matter consisting substantially of particles of a comminuted macro-crystalline multi-carbide having, as a major constituent, a carbide of a metal of the group consisting of tantalum and columbium and, as a minor constituent, a carbide or carbides of a metal or metals of the group consisting of tantalum, columbium, titanium and zirconium, embedded in a matrix formed of an alloy of a metal of the group consisting of tungsten and molybdenum with a metal of the iron group, said particles constituting the major portion of said composition of matter.

2. The new hard composition of matter consisting substantially of particles of a comminuted macro-crystalline multi-carbide having, as a major constituent, a carbide of the group of metals consisting of tantalum and columbium and, as a minor constituent, a carbide or carbides of a metal or metals of the group consisting of tantalum, columbium, titanium and zirconium, in which the minor constituent is in solid solution in the major constituent, said carbide particles being embedded in a matrix formed of an alloy of a metal of the group consisting of tungsten and molybdenum with a metal of the iron group, said particles constituting the major portion of said composition of matter.

3. The new hard composition of matter consisting substantially of particles of a comminuted macro-crystalline multi-carbide having, as a major constituent, a carbide of the metals of the group consisting of tantalum and columbium and, as a minor constituent, one or more of the carbides of the metals of the group consisting of tantalum, columbium, titanium and zirconium, in which the minor constituent constitutes about 25 molecular per cent of the multi-carbide, said particles being embedded in a matrix formed of an alloy of a metal of the group consisting of tungsten and molybdenum with a metal of the iron group, said particles constituting the major portion of said composition of matter.

4. A new hard composition of matter consisting substantially of a matrix formed of an alloy of a metal of the group consisting of tungsten and molybdenum with a metal of the iron group, in which there are embedded particles of a comminuted macro-crystalline multi-carbide including titanium carbide in solid solution in a carbide of a metal of the group consisting of tantalum and columbium, said particles constituting the major portion of said composition of matter.

5. The new hard composition of matter consisting substantially of particles of a comminuted macro-crystalline multi-carbide consisting of tantalum carbide having in solid solution therein one or more carbides of the group consisting of columbium, titanium and zirconium, said particles being embedded in a matrix formed of an alloy of a metal of the group consisting of tungsten and molybdenum with a metal of the iron group, said particles constituting the major portion of said composition of matter.

6. A new hard composition of matter consisting substantially of particles of a comminuted macro-crystalline multi-carbide having tantalum carbide as its major constituent and, as its minor constituent, a carbide of a metal of the group consisting of columbium, titanium and zirconium, said particles being embedded in a matrix formed of an alloy of a metal in the group consisting of tungsten and molybdenum with a metal of the iron group, said particles constituting the major portion of said composition of matter.

7. The new hard composition of matter consisting substantially of particles of a comminuted macro-crystalline multi-carbide consisting of columbium carbide in solid solution in tantalum carbide, in which the carbon content is in monatomic ratio to the metals present, said particles being embedded in a matrix formed of an alloy of a metal of the group consisting of tungsten and molybdenum with a metal of the iron group, said particles constituting the major portion of said composition of matter.

8. A new hard composition of matter consisting substantially of particles of a comminuted macro-crystalline multi-carbide having tantalum carbide as its major constituent and, as a minor constituent, from 5 to 13 per cent of columbium carbide, the said particles being embedded in a matrix formed of an alloy of a metal of the group consisting of tungsten and molybdenum with a metal of the iron group, said particles constituting the major portion of said composition of matter.

9. A new hard composition of matter consisting substantially of from 68 to 80 per cent of a comminuted macro-crystalline multi-carbide, of which tantalum carbide is the major constituent and from 5 to 13 per cent columbium carbide the minor constituent, from 13 to 25 per cent tungsten, and from 5 to 12 per cent nickel.

10. A new hard composition of matter consisting substantially of 75 per cent of a comminuted macro-crystalline multi-carbide, consisting of tantalum carbide as the major constituent and substantially 9 per cent columbium carbide as a minor constituent, about 15 per cent tungsten, and about 10 per cent nickel.

11. A new hard composition of matter consisting substantially of a matrix formed of an alloy of a metal of the group consisting of tungsten and molybdenum with a metal of the iron group, having embedded therein particles of a comminuted macro-crystalline multi-carbide consisting of titanium carbide in solid solution in tantalum carbide, said particles constituting the major portion of said composition of matter.

12. The new hard composition of matter consisting substantially of a matrix formed of an alloy of a metal of the group consisting of tungsten and molybdenum with a metal of the iron group, in which are embedded particles of a comminuted macro-crystalline multi-carbide of which tantalum carbide is the major constituent and zirconium carbide is the minor constituent, said particles constituting the major portion of said composition of matter.

13. The new hard composition of matter consisting substantially of a matrix formed of an alloy of a metal of the group consisting of tungsten and molybdenum with a metal of the iron group, in which are embedded particles of a comminuted macro-crystalline multi-carbide in which zirconium carbide is in solid solution in tantalum carbide, said particles constituting the major portion of said composition of matter.

14. The new hard composition of matter consisting substantially of a matrix formed of an alloy of a metal of the group consisting of tungsten and molybdenum with a metal of the iron group, in which are embedded particles of a comminuted macro-crystalline multi-carbide of which tantalum carbide is the major constituent and from 8 to 13 per cent of zirconium carbide the minor constituent, said particles constituting the major portion of said composition of matter.

15. The new hard composition of matter consisting substantially of from 8 to 18 per cent tungsten, from 12 to 18 per cent nickel, and from 65 to 80 per cent of a comminuted macro-crystalline multi-carbide having tantalum carbide as its major constituent and, as a minor constituent, from 8 to 13 per cent of zirconium carbide.

16. The new hard composition of matter consisting substantially of about 11 per cent tungsten, about 15 per cent nickel and about 74 per cent of a comminuted macro-crystalline multi-carbide containing about 9 per cent zirconium carbide in solid solution in tantalum carbide.

PHILIP M. McKENNA.